US012510840B2

(12) United States Patent
Horiuchi

(10) Patent No.: US 12,510,840 B2
(45) Date of Patent: Dec. 30, 2025

(54) CONTROLLING EXPOSURE APPARATUS USED IN IMAGE FORMING APPARATUS

(71) Applicant: CANON KABUSHIKI KAISHA, Tokyo (JP)

(72) Inventor: Izuru Horiuchi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 142 days.

(21) Appl. No.: 18/376,155

(22) Filed: Oct. 3, 2023

(65) Prior Publication Data

US 2024/0111248 A1 Apr. 4, 2024

(30) Foreign Application Priority Data

Oct. 4, 2022 (JP) ................................ 2022-160469

(51) Int. Cl.

| | |
|---|---|
| ***G03G 21/20*** | (2006.01) |
| ***B41J 2/45*** | (2006.01) |
| ***G03G 13/04*** | (2006.01) |
| ***G03G 15/01*** | (2006.01) |
| ***G03G 15/04*** | (2006.01) |
| ***G03G 15/041*** | (2006.01) |
| ***G03G 15/043*** | (2006.01) |

(52) U.S. Cl.

CPC ............ *G03G 15/0415* (2013.01); *B41J 2/45* (2013.01); *B41J 2/451* (2013.01); *G03G 13/04* (2013.01); *G03G 15/0115* (2013.01); *G03G 15/04027* (2013.01); *G03G 15/0409* (2013.01); *G03G 15/043* (2013.01); *G03G 15/0435* (2013.01); *G03G 21/20* (2013.01)

(58) Field of Classification Search

CPC ...... G03G 21/20; G03G 13/04; G03G 15/011; G03G 15/0115; G03G 15/04; G03G 15/04027; G03G 15/04045; G03G 15/04054; G03G 15/0409; G03G 15/041; G03G 15/0415; G03G 15/043; G03G 15/0435; B41J 2/45; B41J 2/451

See application file for complete search history.

(56) References Cited

U.S. PATENT DOCUMENTS

| | | | | |
|---|---|---|---|---|
| 10,384,464 | B2 | 8/2019 | Uemura et al. | |
| 2018/0367693 | A1 * | 12/2018 | Obayashi ........... | G03G 15/0415 |

FOREIGN PATENT DOCUMENTS

| | | | | |
|---|---|---|---|---|
| JP | 2008155458 | A | * | 7/2008 |
| JP | 2018-062131 | A | | 4/2018 |
| JP | 2019104186 | A | * | 6/2019 |

* cited by examiner

*Primary Examiner* — Douglas X Rodriguez
*Assistant Examiner* — Kendrick X Liu
(74) *Attorney, Agent, or Firm* — Venable LLP

(57) ABSTRACT

An exposure head includes a substrate on which light sources are mounted, and a condensing optical system. A memory stores a profile indicating correction gains for exposure amounts. A sensor detects a temperature. A processor acquires a correction gain that corresponds to a position of a light source that reached an exposure timing, corrects, for each of the light sources, an exposure amount of the light source with the correction gain corresponding to the position of the light source, and adjusts, for each of the light sources, a reference position of the corresponding correction gain in the profile in accordance with the temperature detected by the sensor.

15 Claims, 18 Drawing Sheets

CONTROLLING EXPOSURE APPARATUS USED IN IMAGE FORMING APPARATUS

BACKGROUND OF THE INVENTION

Field of the Invention

The present invention relates to controlling an exposure apparatus used in an image forming apparatus.

Description of the Related Art

An electrophotographic image forming apparatus forms an image by exposing a rotating photosensitive member to light to form an electrostatic latent image on the photosensitive member, and then developing the electrostatic latent image with toner. In particular, organic electro-luminescence (EL) type exposure devices that use organic EL elements for exposure have attracted attention in recent years due to making it easier to achieve size reduction, an improvement in noise reduction, and cost reduction compared with laser scanning type exposure devices that use laser light.

The exposure head of such an exposure device includes a substrate on which a plurality of light emitting elements are arranged, and a rod lens array for condensing the light output from the light emitting elements onto the surface of the photosensitive member. Since the exposure head is an equal-magnification optical system, the length of the exposure head in the lengthwise direction is greater than or equal to the width of the sheet on which an image is to be formed.

Here, when the substrate of the exposure head expands due to heat, the positions of the light emitting elements become displaced relative to the position of the rod lens array, thus resulting in unevenness in exposure in the lengthwise direction of the exposure head. In Japanese Patent Laid-Open No. 2018-062131, technology is proposed in which a light receiving element is provided at a lengthwise end portion of the exposure head, the amount of elongation of the substrate is detected, and the amounts of light emitted from the light emitting elements are corrected according to the amount of elongation.

According to Japanese Patent Laid-Open No. 2018-062131, a dedicated light receiving element is required to detect the amount of expansion of the substrate. Furthermore, according to Japanese Patent Laid-Open No. 2018-062131, a plurality of rod lenses are aligned in a row, but instead of this, it is conceivable for a plurality of cylindrical lenses to be disposed in a staggered arrangement. If cylindrical lenses are disposed in a staggered arrangement, the condensing efficiency can be made more uniform.

However, the period of the staggered arrangement of the cylindrical lenses is larger than the arrangement period (resolution) of the light emitting elements. For this reason, depending on the positional relationship between the light emitting elements and the cylindrical lenses, a slight amount of unevenness in exposure occurs in accordance with the period of the staggered arrangement. Here, if the relationship between the positions of the light emitting elements and the positions of the cylindrical lenses is fixed, unevenness in exposure can be mitigated by correcting the exposure amount according to the positions of the light emitting elements. However, the relationship between the positions of the light emitting elements and the positions of the cylindrical lenses changes due to the ambient temperature and heat generated by the light emitting elements. For this reason, even when using an exposure head that includes cylindrical lenses disposed in a staggered arrangement, there is desire to reduce unevenness in exposure that occurs in the lengthwise direction of the exposure head when the temperature changes.

An object of the present invention is to reduce unevenness in exposure that occurs in the lengthwise direction of the exposure head.

SUMMARY OF THE INVENTION

The disclosure describes an exposure apparatus comprising an exposure head including a substrate on which a plurality of light sources are mounted in an arrangement along an axial direction of a photosensitive member, a condensing optical system arranged along a lengthwise direction of the substrate and configured to condense light output from the plurality of light sources onto a circumferential surface of the photosensitive member to form a plurality of exposure spots on the circumferential surface, and a support member supporting the substrate and the condensing optical system; a memory having stored therein a profile indicating correction gains for exposure amounts, the correction gains corresponding to condensing efficiencies of the condensing optical system at a plurality of positions along a lengthwise direction; a sensor configured to detect a temperature correlated with a temperature of the exposure head; and at least one processor configured to perform operations, the operations including acquiring, by referencing the profile, the correction gain that corresponds to a position, along the lengthwise direction of the substrate, of a light source that reached an exposure timing among the plurality of light sources; correcting, for each of the light sources, an exposure amount of the light source with the correction gain corresponding to the position of the light source; and adjusting, for each of the light sources, a reference position of the corresponding correction gain in the profile in accordance with the temperature detected by the sensor.

Further features of the present invention will become apparent from the following description of exemplary embodiments (with reference to the attached drawings).

DESCRIPTION OF THE EMBODIMENTS

Figure 1:
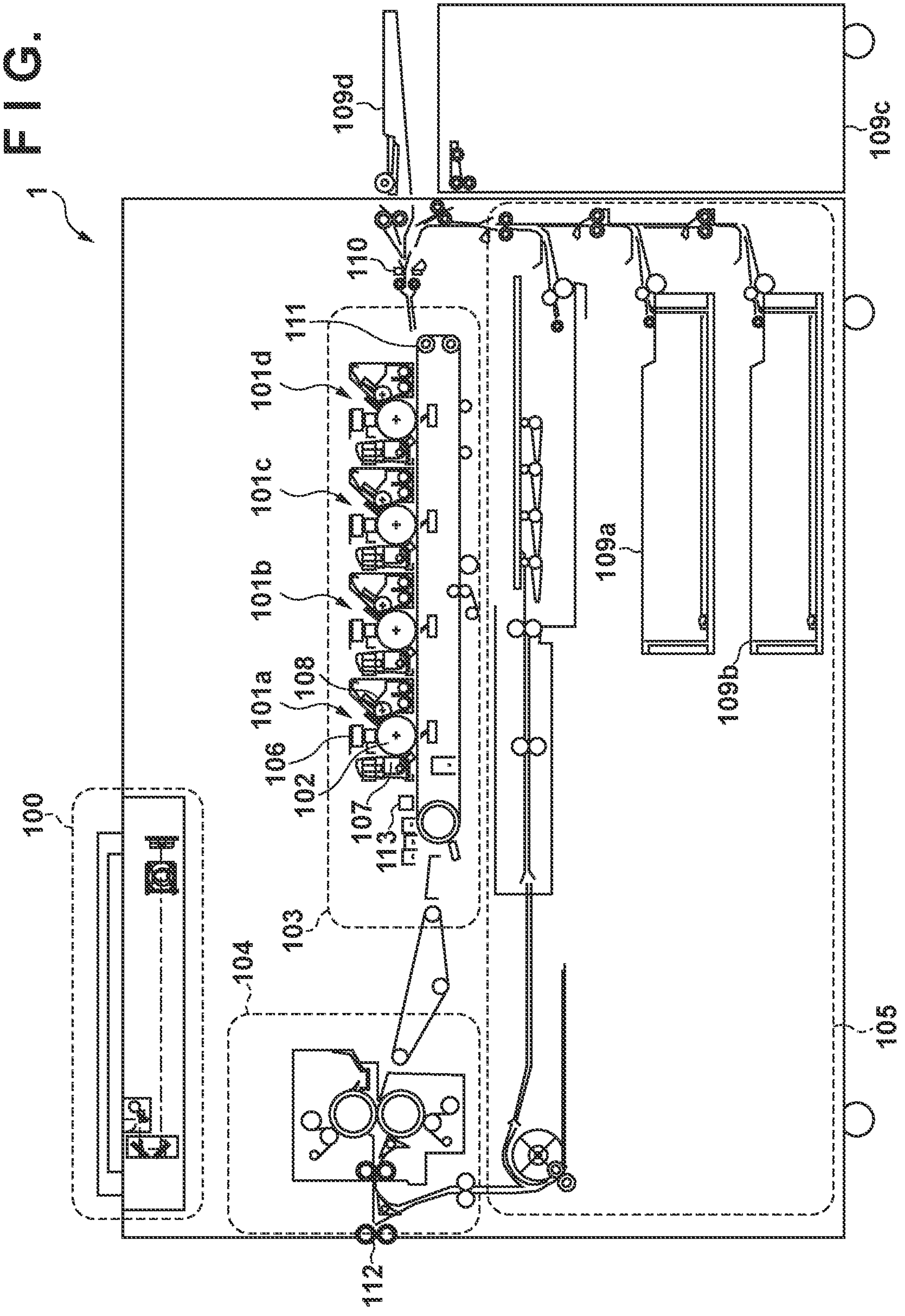
FIG. 1 is a configuration diagram showing a schematic configuration of an image forming apparatus according to an embodiment.

Hereinafter, embodiments will be described in detail with reference to the accompanying drawings. Note that the following embodiments are not intended to limit the invention pertaining to the scope of claims. Although multiple features are described in the embodiments, not all of such features are essential to the invention, and features may be combined as desired. Furthermore, in the accompanying drawings, configurations that are the same or similar are denoted by the same reference numerals, and redundant descriptions thereof are omitted.

1. Schematic Configuration of Image Forming Apparatus

FIG. 1 shows an example of the schematic configuration of an image forming apparatus 1 according to an embodiment. The image forming apparatus 1 includes a reading unit 100, an image forming unit 103, a fixing unit 104, and a conveying unit 105. The reading unit 100 optically reads a document placed on a document platen and generates read image data. The image forming unit 103 forms an image on a sheet based on read image data generated by the reading unit 100 or based on print image data received from an external device via a network, for example.

The image forming unit 103 includes image formation units 101*a*, 101*b*. 101*c*, and 101*d*. The image formation units 101*a*, 101*b*, 101*c*, and 101*d* respectively form black, yellow, magenta, and cyan toner images. The image formation units 101*a*, 101*b*, 101*c*, and 101*d* have the same configuration, and will be collectively referred to as the image formation units 101 hereinafter. In each of the image formation units 101, a photosensitive member 102 is driven to rotate in the clockwise direction in the figure during image formation. A charger 107 electrically charges the photosensitive member 102. An exposure head 106 exposes the photosensitive member 102 to form an electrostatic latent image on the surface of the photosensitive member 102. A developing unit 108 develops the electrostatic latent image on the photosensitive member 102 with toner to form a toner image. The toner image formed on the surface of the photosensitive member 102 is transferred onto a sheet conveyed on a transfer belt 111. A color image containing the four color components black, yellow, magenta, and cyan can be formed by transferring toner images from the four photosensitive members 102 onto a sheet in a superimposed manner.

The conveying unit 105 controls sheet feeding and conveying. Specifically, a specified unit is specified from among internal storage units 109*a* and 109*b*, an external storage unit 109*c*, and a manual feed unit 109*d*, and the conveying unit 105 feeds a sheet from the specified unit to the transport path of the image forming apparatus 1. The fed sheet is conveyed to registration rollers 110. The registration rollers 110 convey the sheet onto the transfer belt 111 at an appropriate timing according to which the toner images on the photosensitive members 102 are transferred onto the sheet. As described above, the toner images are transferred onto the sheet while the sheet is being conveyed on the transfer belt 111. The fixing unit 104 heats and presses the sheet onto which the toner images have been transferred, thereby fixing the toner images onto the sheet. After the toner images have been fixed, the sheet is discharged from the image forming apparatus 1 by discharge rollers 112. An optical sensor 113 is arranged at a position facing the transfer belt 111. The optical sensor 113 is for optically reading a test chart formed on the transfer belt 111 by the image formation units 101. If an error in the image forming range is detected based on the test chart read by the optical sensor 113, a later-described image controller 700 performs control for compensating for the error when executing subsequent jobs.

Note that although an example in which toner images are directly transferred from the photosensitive members 102 onto a sheet on the transfer belt 111 has been described here, the toner images may be indirectly transferred from the photosensitive members 102 onto the sheet via an intermediate transfer member. Also, although an example of forming a color image using multiple colors of toner has been described here, the technology according to the present disclosure can also be applied to an image forming apparatus that forms a monochrome image using a single color of toner.

2. Example of Configuration of Exposure Head

Figure 2A:
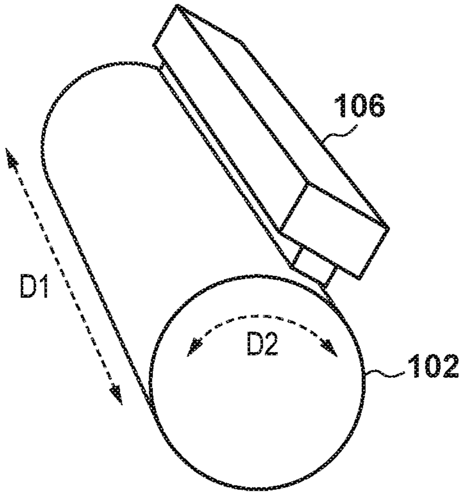
FIGS. 2A and 2B are illustrative diagrams of configurations of a photosensitive member and an exposure head according to an embodiment.
Figure 2B:
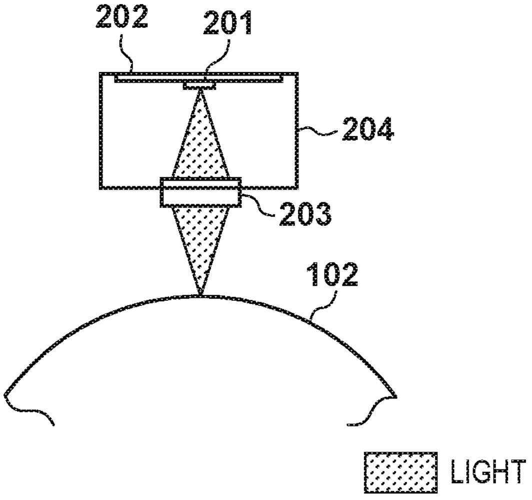

FIGS. 2A and 2B show one photosensitive member 102 and one exposure head 106. The exposure head 106 includes a light emitting element array 201, a printed substrate 202 on which the light emitting element array 201 is mounted, a rod lens array 203, and a housing 204 that supports the printed substrate 202 and the rod lens array 203. The photosensitive member 102 has a cylindrical shape. The exposure head 106 is arranged such that the lengthwise direction thereof is parallel with an axial direction D1 of the photosensitive member 102, and such that the surface on which the rod lens array 203 is attached faces the surface of the photosensitive member 102. While the photosensitive member 102 rotates in a circumferential direction D2, the light emitting element array 201 of the exposure head 106 emits light, and the rod lens array 203 condenses the light onto the surface of the photosensitive member 102.

Figures 3A, 3B:
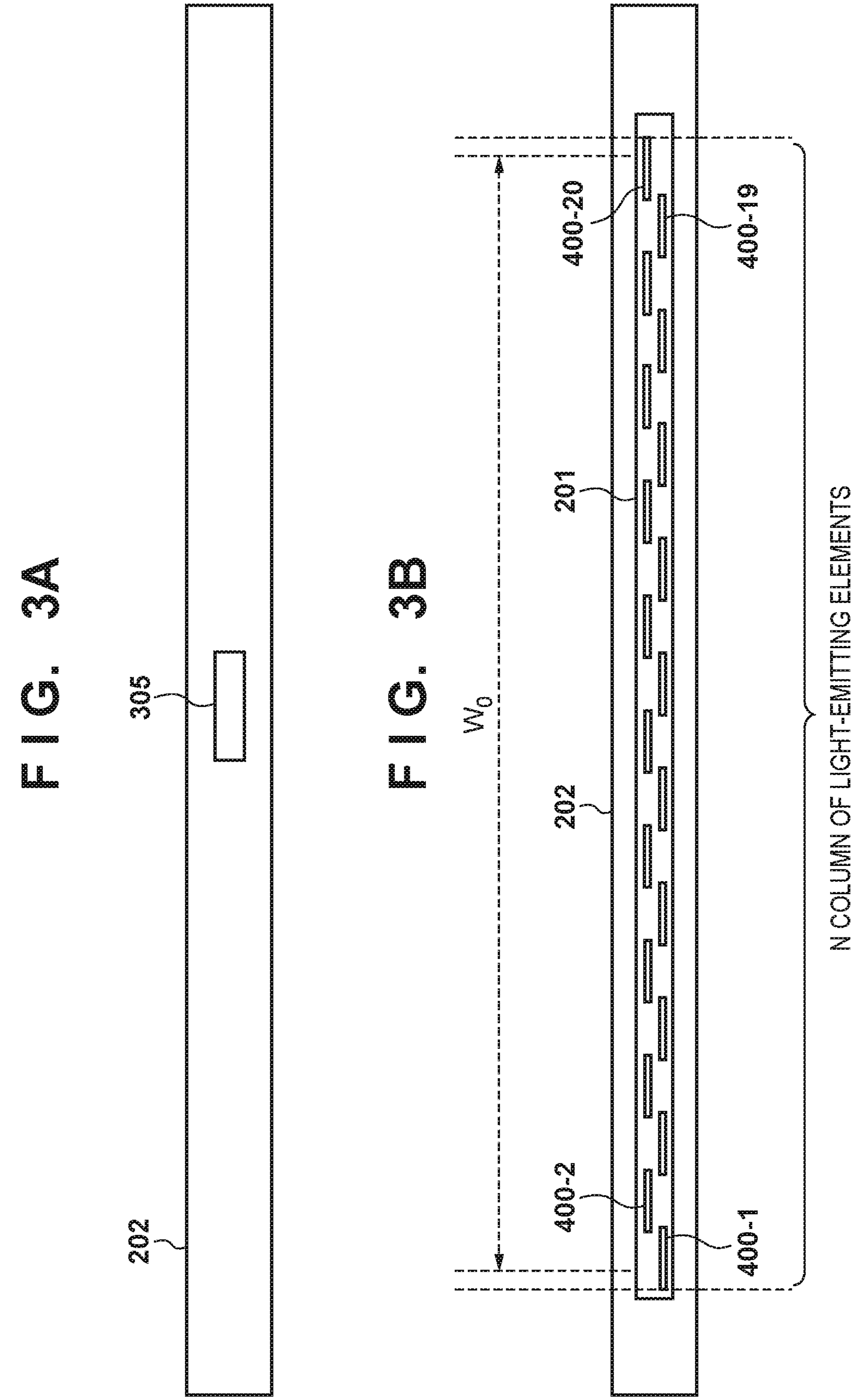
FIGS. 3A and 3B are illustrative diagrams of a configuration of a printed substrate of the exposure head according to an embodiment.
Figure 4:
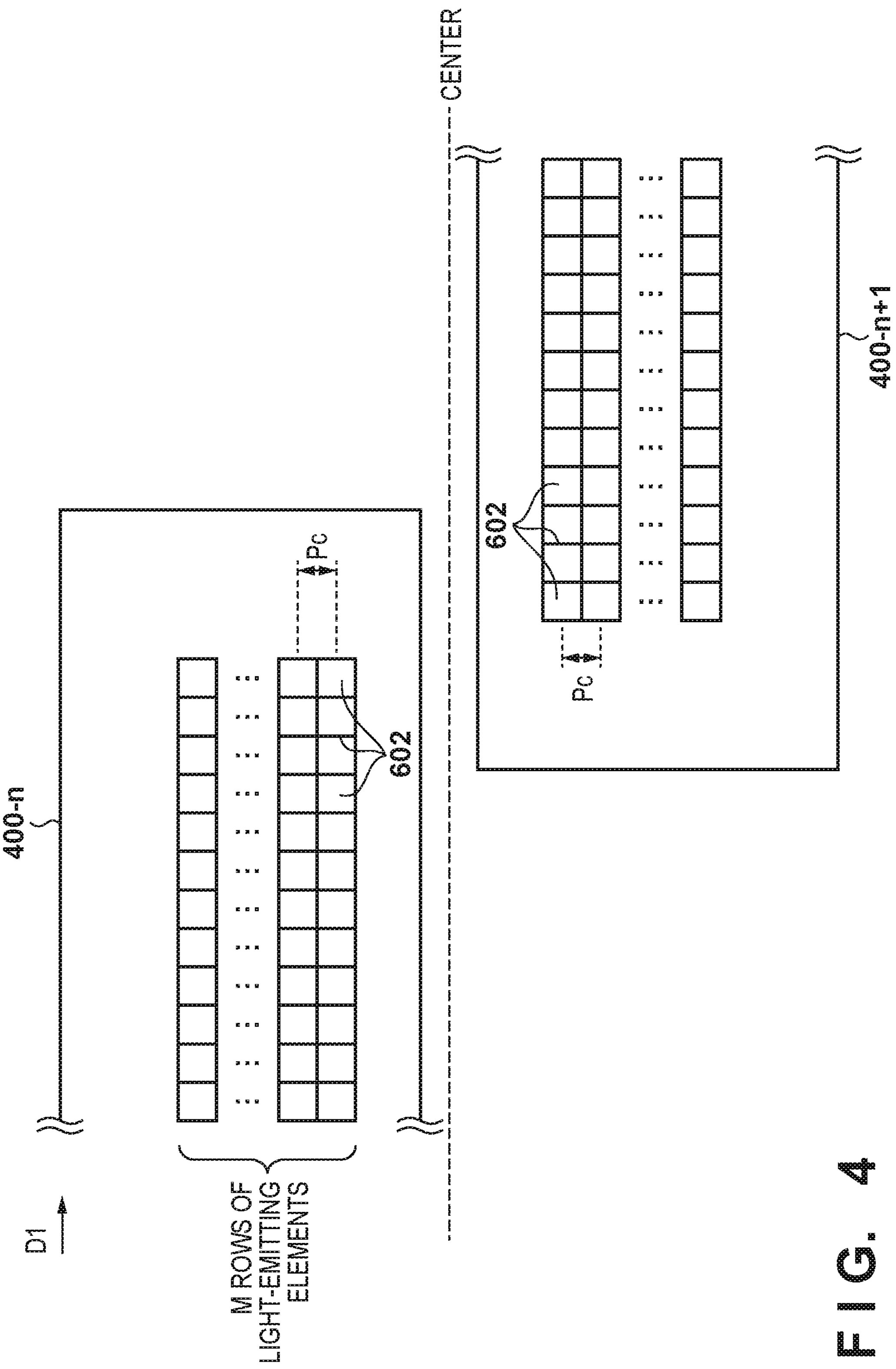
FIG. 4 is an illustrative diagram of light emitting chips and light emitting element arrays in the light emitting chips in an embodiment.

FIGS. 3A and 3B show an example of the configuration of the printed substrate 202. Note that FIG. 3A shows the surface on which a connector 305 is mounted, and FIG. 3B shows the surface on which the light emitting element array 201 is mounted (the surface on the side opposite to the surface on which the connector 305 is mounted). FIG. 4 schematically shows the light emitting chip (light source) 400 and the arrangement of the light emitting elements 602 in the light emitting chip 400.

In the present embodiment, the light emitting element array 201 includes a plurality of light emitting elements arranged two-dimensionally. The light emitting element array 201 overall includes light emitting elements in N columns in the axial direction D1 of the photosensitive member and M rows in the circumferential direction D2, and M and N are integers of 2 or more. In the example shown in FIG. 3B, the light emitting element array 201 is divided into 20 light emitting chips 400-1 to 400-20, each of which contains a subset of the total number of light emitting elements, and the light emitting chips 400-1 to 400-20 are staggered along the axial direction D1. The light emitting chips 400-1 to 400-20 will also be collectively referred to as the light emitting chips 400. As shown in FIG. 3B, the range occupied by all of the light emitting elements of the 20 light emitting chips in the axial direction D1 is wider than a maximum width W0 of input image data. Accordingly, as long as no error has been detected in the image forming range, some of the light emitting elements positioned at the two ends in the axial direction D1 may not be used to expose the photosensitive member 102. The light emitting chips 400 of the printed substrate 202 are each connected to an image controller 700 (FIG. 7) via the connector 305. In the following, for convenience in the description, among the light emitting chips 400-1 to 400-20 arranged along the axial direction D1, the side corresponding to the light emitting chips that have smaller suffix numbers is sometimes called the "left" side, and the side corresponding to the light emitting chips that have larger suffix numbers is sometimes called the "right" side. For example, the light emitting chip 400-1 is the leftmost light emitting chip 400, and the light emitting chip 400-20 is the rightmost light emitting chip.

Here, J (J=N/20) indicates the number of light emitting elements 602 arranged in each row of one light emitting chip 400, and J may be equal to 748 (J=748), for example. On the other hand, the number M of light emitting elements 602 arranged in each column of one light emitting chip 400 may be equal to 4 (M=4), for example. In other words, in the exemplary embodiment, each light emitting chip 400 includes a total of 2,992 (=748×4) light emitting elements 602, that is to say 748 light emitting elements in the axial direction D1 by 4 light emitting elements in the circumferential direction D2. A gap PC between the center points of adjacent light emitting elements 602 in the circumferential direction D2 may be approximately 21.16 μm, which corresponds to a resolution of 1200 dpi, for example. The gap in the axial direction D1 between the center points of adjacent light emitting elements 602 may also be about 21.16 μm, and in this case, 748 light emitting elements 602 occupy a range with a length of about 15.8 mm in the axial direction D1. For convenience in the description, FIG. 4 shows an example in which the light emitting elements 602 are completely arranged in a grid pattern in each of the light emitting chips 400, but in actuality, the M (M=4) light emitting elements 602 in each column are arranged in a stepped manner. This point will be described in more detail later.

Figure 5:
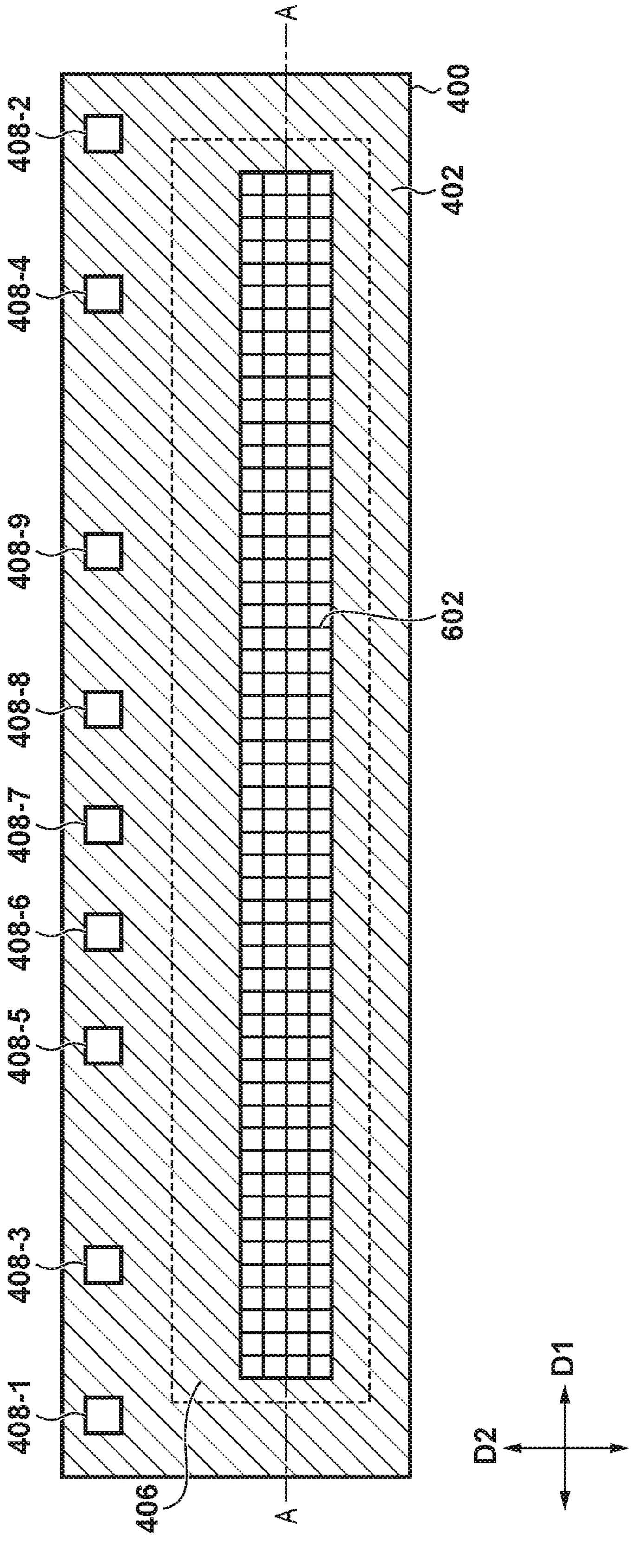
FIG. 5 is a plan view showing a schematic configuration of a light emitting chip according to an embodiment.

FIG. 5 is a plan view showing the schematic configuration of one light emitting chip 400. In each light emitting chip 400, the light emitting elements 602 are formed on a light emitting substrate 402, which is a silicon substrate, for example. Also, the light emitting substrate 402 is provided with a circuit unit 406 for driving the light emitting elements 602. Signal lines for communication with the image controller 700, a power line for connection to a power source, and a ground line for grounding are connected to pads 408-1 to 408-9. The signal lines, the power line, and the ground line may be wires made of gold, for example.

Figure 6:
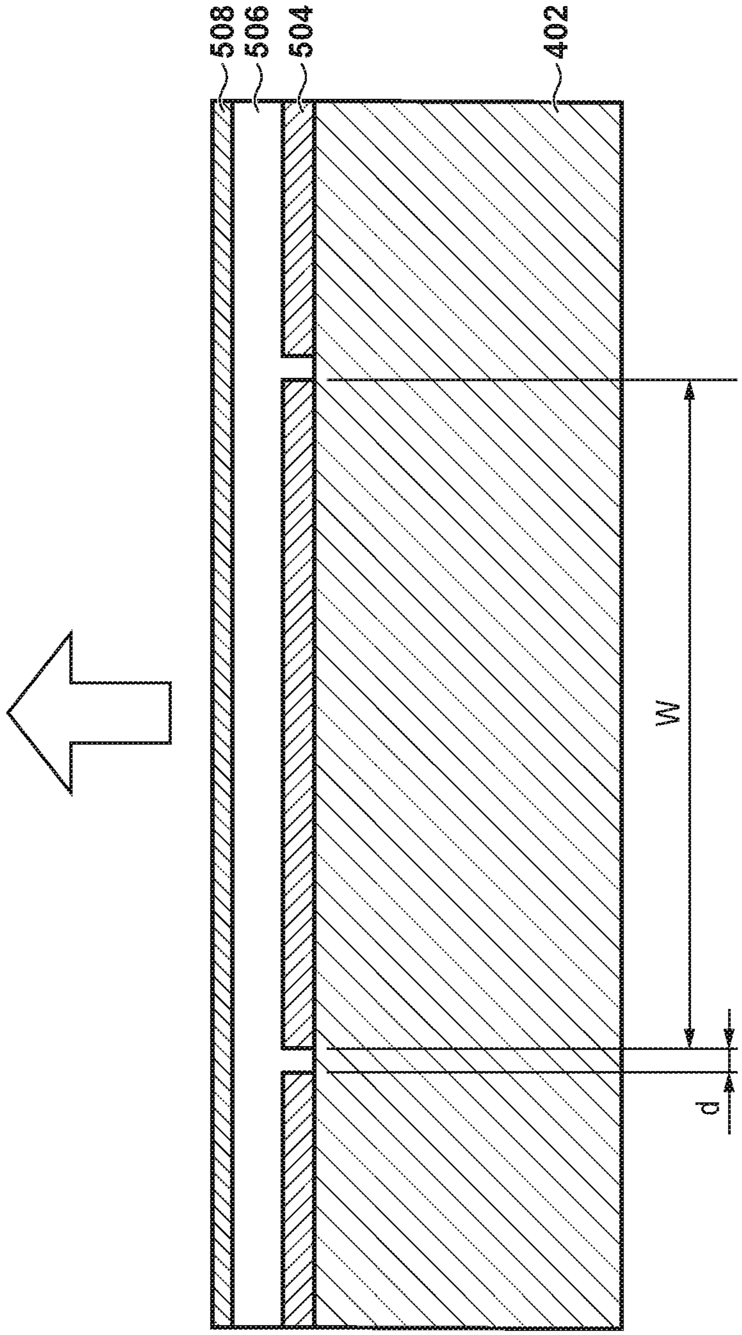
FIG. 6 is a cross-sectional view showing a schematic configuration of a light emitting chip according to an embodiment.

FIG. 6 shows part of a cross-section taken along line A-A in FIG. 5. A plurality of bottom electrodes 504 are formed on the light emitting substrate 402. Adjacent bottom electrodes 504 are separated by a gap with a length d. A light emitting layer 506 is provided on the bottom electrodes 504, and a top electrode 508 is provided on the light emitting layer 506. The top electrode 508 is one common electrode for all of the bottom electrodes 504. When a voltage is applied between the bottom electrodes 504 and the top electrode 508, current flows from the bottom electrodes 504 to the top electrode 508, causing the light emitting layer 506 to emit light. Therefore, each of the light emitting elements 602 is constituted by one bottom electrode 504 and partial regions of the light emitting layer 506 and the top electrode 508 that correspond to the one bottom electrode 504. In other words, in the present embodiment, the light emitting substrate 402 includes a plurality of light emitting elements 602.

An organic EL film can be used for the light emitting layer 506, for example. The top electrode 508 is constituted by a transparent electrode made of indium tin oxide (ITO) in order to transmit the wavelength of light emitted by the light emitting layer 506. Note that in the present embodiment, the entirety of the top electrode 508 transmits the wavelength of light emitted by the light emitting layer 506, but it is not necessary for the entirety of the top electrode 508 to transmit the wavelength of emitted light. Specifically, it is sufficient that the wavelength of emitted light is transmitted through the partial regions through which the light from the light emitting elements 602 passes.

Note that although one continuous light emitting layer 506 is formed in FIG. 6, a configuration is possible in which a plurality of light emitting layers 506, each having a width equivalent to the width W of one bottom electrode 504, are formed on the corresponding bottom electrodes 504. Also, in FIG. 6, the top electrode 508 is formed as one common electrode for all of the bottom electrodes 504, but a configuration is possible in which a plurality of top electrodes 508, each having a width equivalent to the width W of one bottom electrode 504, are formed on the corresponding bottom electrodes 504. Also, a configuration is possible in which, among the bottom electrodes 504 of each light emitting chip 400, a first group of bottom electrodes 504 are covered by a first light emitting layer 506, and a second group of bottom electrodes 504 are covered by a second light emitting layer 506. Similarly, a configuration is possible in which, among the bottom electrodes 504 of each light emitting chip 400, a first top electrode 508 is formed as a common electrode for a first group of bottom electrodes 504, and a second top electrode 508 is formed as a common electrode for a second group of bottom electrodes 504. In these configurations as well, each light emitting element 602 is constituted by one bottom electrode 504 and regions of the light emitting layer 506 and the top electrode 508 that correspond to the one bottom electrode 504.

Figure 7:
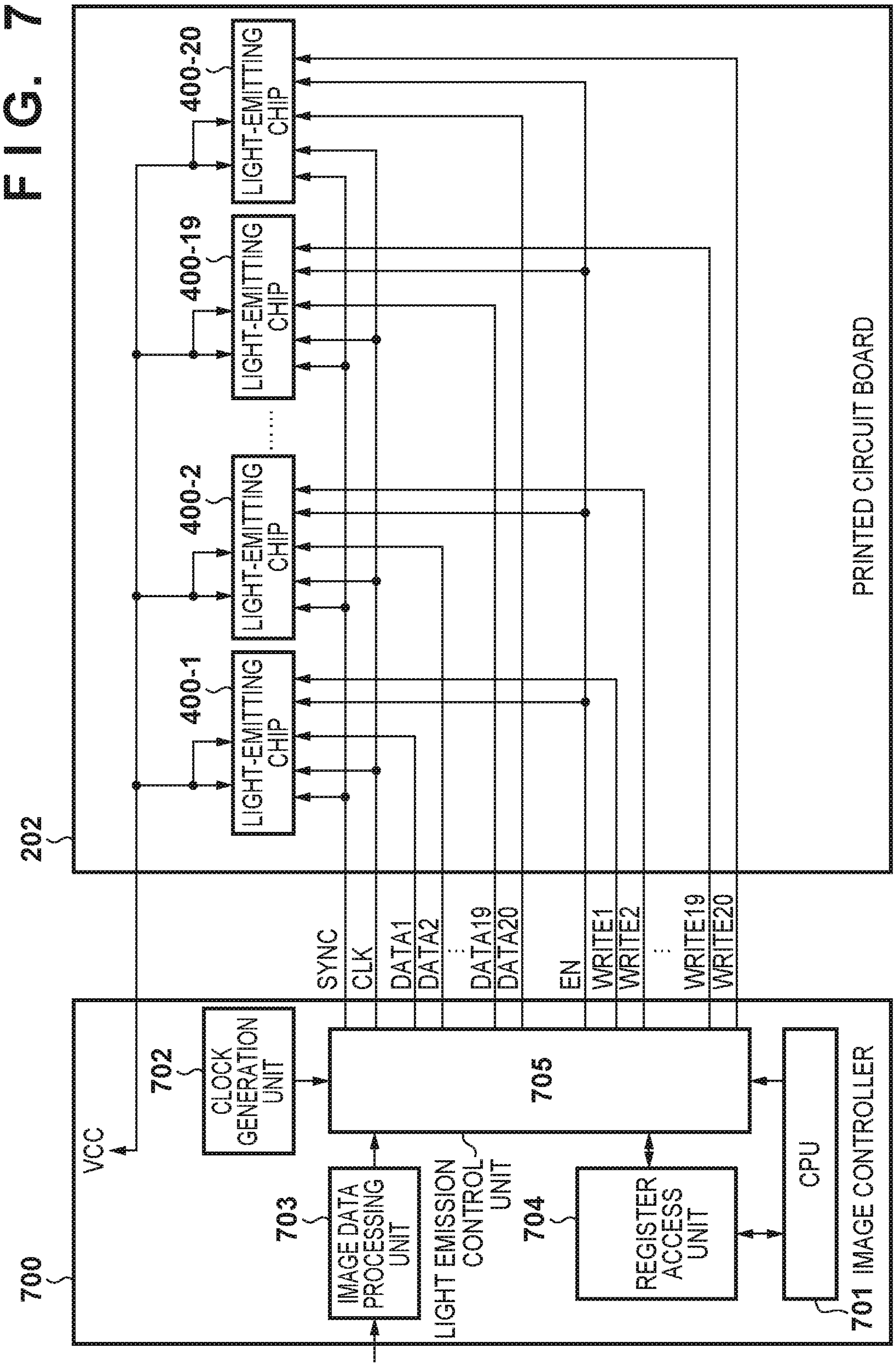
FIG. 7 is a circuit diagram showing a control configuration of an exposure device according to an embodiment.

FIG. 7 is a circuit diagram regarding a control configuration for controlling the light emitting chips 400. The image controller 700 is a control circuit that communicates with the printed substrate 202 via a plurality of signal lines (wires). The image controller 700 includes a CPU 701, a clock generation unit 702, an image data processing unit 703, a register access unit 704, and a light emission control unit 705. The light emission control unit 705 is a constituent element that constitutes the exposure device together with the exposure head 106. The light emission control unit 705 terminates signal lines connected to the printed substrate 202. An n-th light emitting chip 400-*n* (n is an integer from 1 to 20) on the printed substrate 202 is connected to the light emission control unit 705 via a signal line DATAn and a signal line WRITEn. The signal line DATAn is used to transmit image data from the image controller 700 to the light emitting chip 400-*n*. The signal line WRITEn is used by the image controller 700 to write control data to the register of the light emitting chip 400-*n*.

One signal line CLK, one signal line SYNC, and one signal line EN are provided between the light emission control unit 705 and each of the light emitting chips 400. The signal line CLK is used to transmit a clock signal for the transmission of data on the signal lines DATAn and WRITEn. The light emission control unit 705 outputs, to the signal line CLK, a clock signal generated based on a reference clock signal from the clock generation unit 702. The signals transmitted to the signal line SYNC and the signal line EN will be described later.

The CPU 701 performs overall control of the image forming apparatus 1. The image data processing unit 703 performs image processing on image data received from the reading unit 100 or an external device, and generates image data in the binary bitmap format for controlling the ON and OFF states of light emission by the light emitting elements 602 of the light emitting chips 400 on the printed substrate 202. The aforementioned image processing can include raster conversion, tone correction, color conversion, and halftone processing, for example. The image data processing unit 703 transmits the generated image data to the light emission control unit 705 as input image data. The register access unit 704 receives control data that is to be written to the registers in the light emitting chips 400 from the CPU 701, and transmits the control data to the light emission control unit 705.

Figure 8:
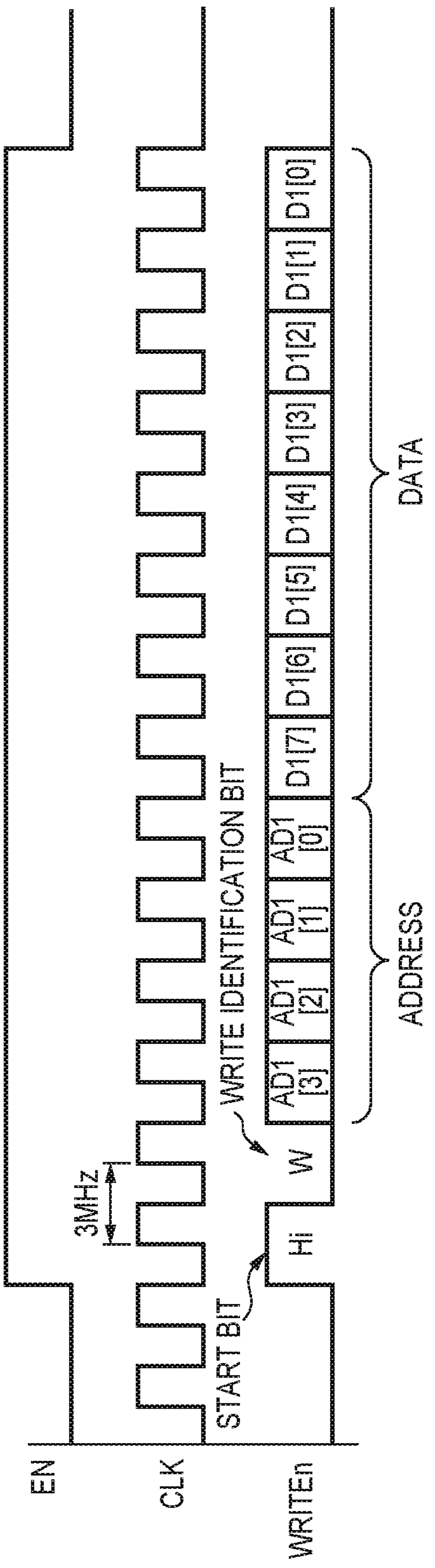
FIG. 8 is a signal chart regarding access to a register of a light emitting chip according to an embodiment.

FIG. 8 shows changes in the signal levels of signal lines when control data is written to the register of a light emitting chip 400. During communication, an enable signal at the high level, to indicate that communication is in progress, is output to the signal line EN. The light emission control unit 705 transmits a start bit over the signal line WRITEn in synchronization with the rise of the enable signal. Subsequently, the light emission control unit 705 transmits a write identification bit indicating a write operation, and then transmits the register address (4 bits in this example) to which the control data is to be written, and transmits the control data (8 bits in this example). When performing writing to the register, the light emission control unit 705 sets the frequency of the clock signal transmitted to the signal line CLK to 3 MHz, for example.

Figure 9:
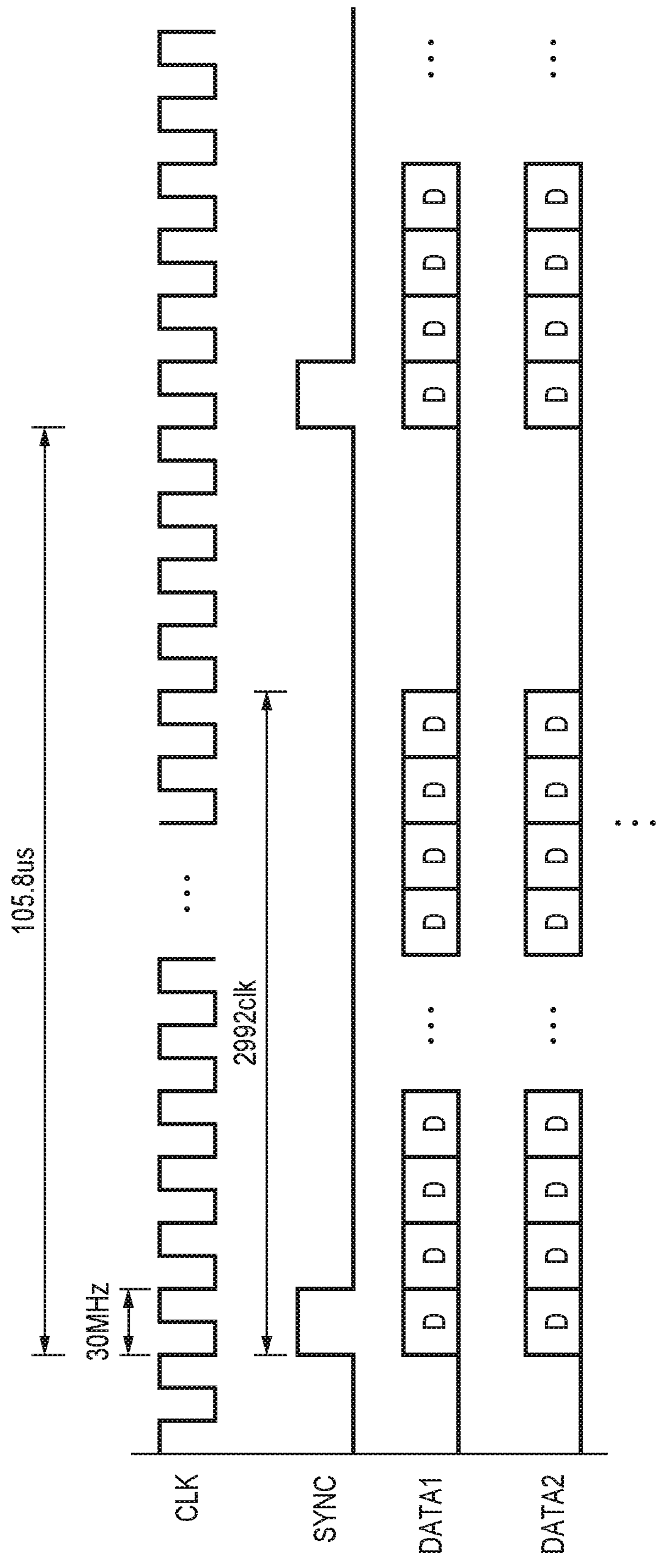
FIG. 9 is a signal chart regarding transmission of image data to a light emitting chip according to an embodiment.

FIG. 9 shows changes in the signal levels of signal lines when image data is transmitted to a light emitting chip 400. A periodic line synchronization signal indicating the exposure timing of each line of the photosensitive member 102 is output to the signal line SYNC. If the rotation speed of the photosensitive member 102 is 200 mm/s and the resolution in the circumferential direction is 1200 dpi (approximately 21.16 μm), the line synchronization signal is output with a period of approximately 105.8 μs. The light emission control unit 705 transmits image data to the signal lines DATA1 to DATA20 in synchronization with the rise of the line synchronization signal. In the present embodiment, each of the light emitting chips 400 has 2,992 light emitting elements 602, and therefore image data indicating light emission or non-light emission for each of a total of 2,992 light emitting elements 602 needs to be transmitted to each of the light emitting chips 400 within a period of about 105.8 μs. For this reason, in this example, as shown in FIG. 9, when transmitting image data, the light emission control unit 705 sets the frequency of the clock signal transmitted to the signal line CLK to 30 MHz.

Figure 10:
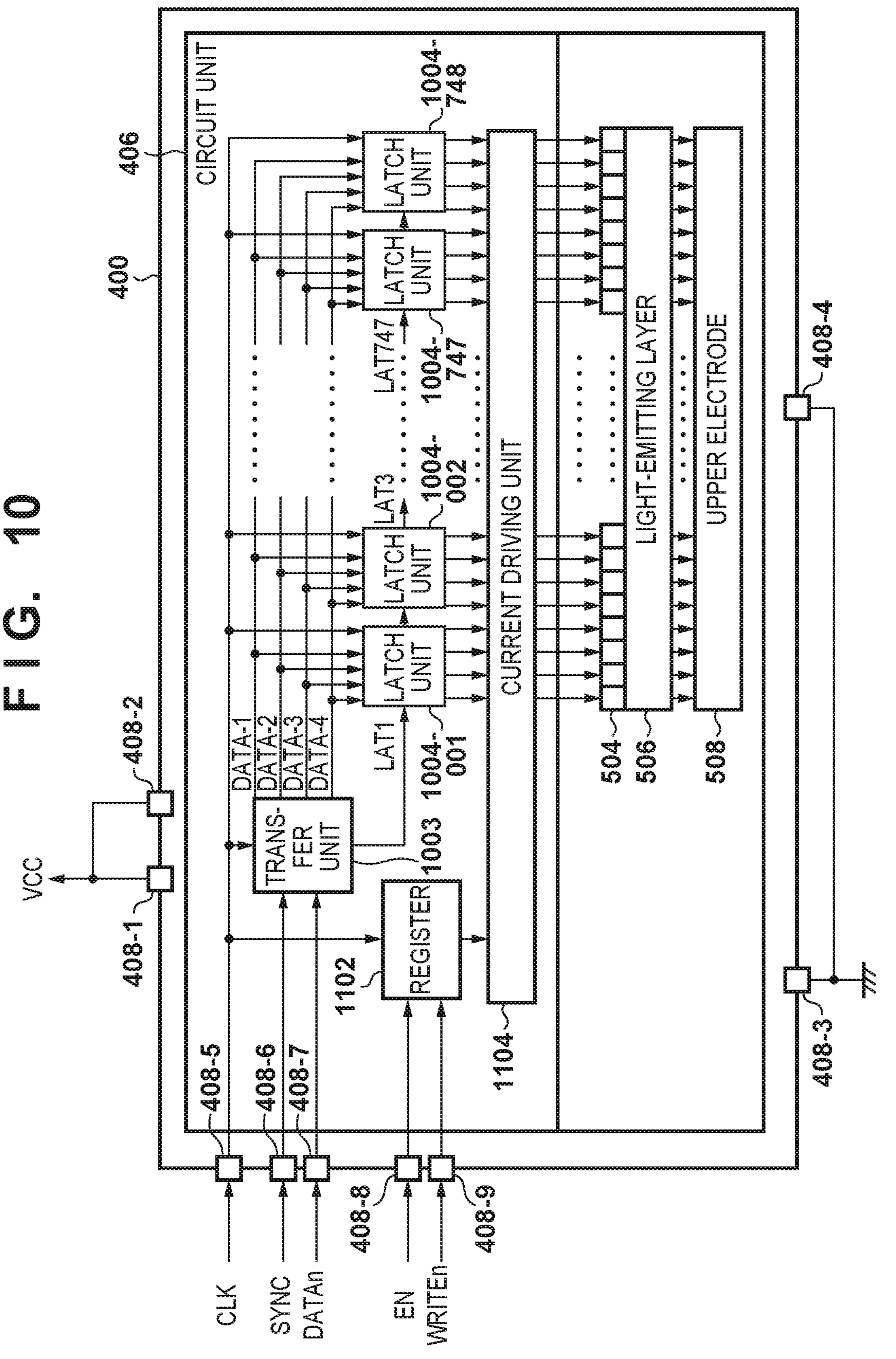
FIG. 10 is a functional block diagram showing a detailed configuration of a light emitting chip according to an embodiment.

FIG. 10 is a functional block diagram showing a detailed configuration of one light emitting chip 400 (the n-th light emitting chip 400-*n*). As shown in FIG. 5 as well, each of the light emitting chips 400 has nine pads 408-1 to 408-9. The pad 408-1 and the pad 408-2 are connected to a power supply voltage VCC by a power line. The circuits in the circuit unit 406 of the light emitting chip 400 each receive power by the power supply voltage VCC. The pad 408-3 and the pad 408-4 are grounded by a ground line. The circuits in the circuit unit 406 and the top electrode 508 are grounded via the pad 408-3 and the pad 408-4. The signal line CLK is connected to a transfer unit 1003, a register 1102, and latch units 1004-001 to 1004-748 via the pad 408-5. The signal lines SYNC and DATAn are connected to the transfer unit 1003 via the pads 408-6 and 408-7. The signal lines EN and WRITEn are connected to the register 1102 via the pads 408-8 and 408-9. The register 1102 stores control data indicating a desired light emission intensity for each of the light emitting elements 602, for example.

Upon receiving the line synchronization signal from the signal line SYNC, in synchronization with the clock signal from the signal line CLK, the transfer unit 1003 receives, from the signal line DATAn, input image data that includes a series of pixel values each indicating light emission or non-light emission for one of the light emitting elements 602. The transfer unit 1003 performs serial-parallel conversion on the series of pixel values serially received from the signal line DATAn in units of M (e.g., M=4) pixel values. For example, the transfer unit 1003 has four cascade-connected D flip-flops, parallelizes pixel values DATA-1, DATA-2, DATA-3, and DATA-4 received over four pulses, and outputs the result to the latch units 1004-0001 to 1004-748. Also, the transfer unit 1003 further has four D flip-flops for delaying the line synchronization signal, and outputs a first latch signal to the latch unit 1004-001 via a signal line LAT1 at a timing delayed by four pulses from when the line synchronization signal was received.

A k-th latch unit 1004-*k* (k is an integer from 1 to 748) receives the four pixel values DATA-1, DATA-2, DATA-3, and DATA-4 from the transfer unit 1003 at the same time as receiving a k-th latch signal, and holds the received pixel values in a latch circuit. Also, except for the final latch unit 1004-748, the k-th latch unit 1004-*k* delays the k-th latch signal by four pulses and outputs a (k+1)-th latch signal to the latch unit 1004-(*k*+1) via the signal line LAT (k+1). Then, during the signal period of the k-th latch signal, the k-th latch unit 1004-*k* continuously outputs drive signals that are based on the four pixel values held by the latch circuit to a current drive unit 1104. For example, there is a delay of four pulses between the timing at which the first latch signal is input to the latch unit 1004-1 and the timing at which the second latch signal is input to the latch unit 1004-2. For this reason, the latch unit 1004-1 outputs drive signals that are based on the first, second, third, and fourth pixel values to the current drive unit 1104, whereas the latch unit 1004-2 outputs drive signals that are based on the fifth, sixth, seventh, and eighth pixel values to the current drive unit 1104. Generally speaking, the latch unit 1004-*k* outputs drive signals that are based on the (4k−3)-th, (4k−2)-th, (4k−1)-th, and (4k)-th pixel values to the current drive unit 1104. Therefore, in the embodiment shown in FIG. 10, 2,992 drive signals for controlling the driving of 2,992 (=748×4) light emitting elements 602 are output substantially in parallel to the current drive unit 1104 by the 748 latch units 1004-001 to 1004-748. Each of the drive signals is a binary signal indicating a high level or a low level.

The current drive unit 1104 includes 2,992 light emission drive circuits that correspond to the 2,992 light emitting elements 602 that each include a partial region of the light emitting layer 506. For each of the light emission drive circuits, while the corresponding drive signal is at the high level indicating that the corresponding light emitting element 602 is to emit light, the light emission drive circuit applies, to the light emitting layer 506 in the corresponding light emitting element 602, a drive voltage that corresponds to the light emission intensity indicated by the control data in the register 1102. Accordingly, current flows through the light emitting layer 506, and the light emitting element 602 emits light. Note that the control data may indicate one individual light emission intensity for each of the light emitting elements 602, may indicate one light emission intensity for each group of light emitting elements 602, or may indicate one common light emission intensity for all of the light emitting elements 602.

3. Correction of Exposure Amount Due to Temperature Rise of Exposure Head

3-1. Fixing of Members in Exposure Head

Figure 11A:
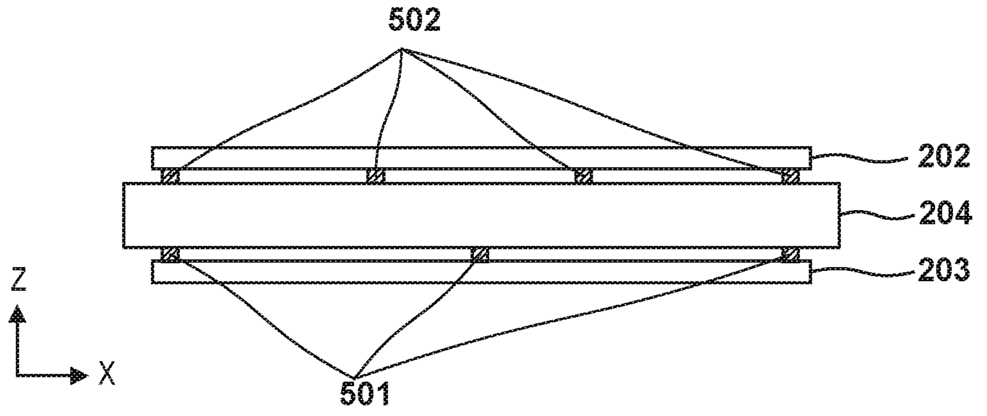
FIGS. 11A to 11C are diagrams illustrating a substrate, a housing, and a rod lens array.

FIG. 11A is a side view of the exposure head 106. The rod lens array 203 is fixed to the housing 204 via a plurality of adhesive portions 501 arranged at equidistant intervals in the lengthwise direction (X direction). The printed substrate 202 is fixed to the housing 204 via a plurality of adhesive portions 502 arranged at equidistant intervals in the X direction. The adhesive portions 501 and 502 are constituted by an adhesive, for example.

Figure 11B:
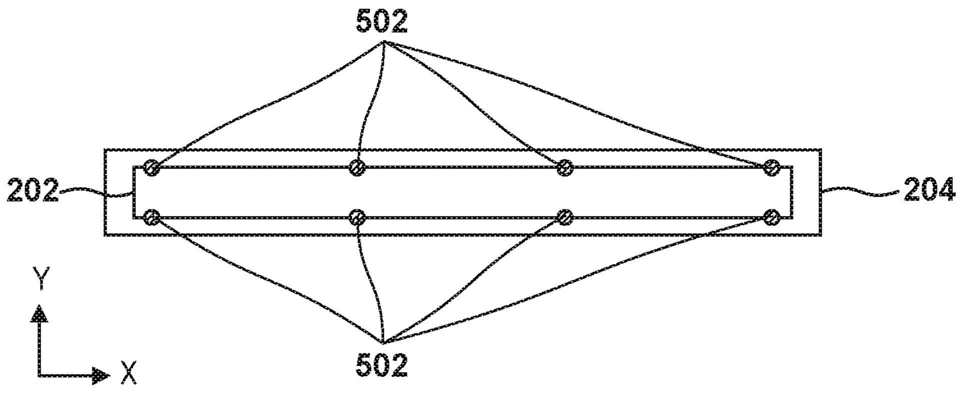

FIG. 11B is a plan view of the exposure head 106. In this example, the adhesive portions 502 are arranged at two different locations with respect to the widthwise direction (Y direction) of the exposure head 106, and at four different locations with respect to the X direction. In other words, the printed substrate 202 is fixed to the housing 204 by a total of eight adhesive portions 502.

Although not shown here, the adhesive portions 512 are arranged at two different locations with respect to the widthwise direction (Y direction) of the exposure head 106, and at three different locations with respect to the X direction. In other words, the rod lens array 203 is fixed to the housing 204 by a total of six adhesive portions 501.

Flexure in the Z direction caused by thermal expansion of the printed substrate 202 can be reduced by increasing the number of adhesive portions 502 in accordance with the rigidity of the printed substrate 202. Flexure in the Z direction caused by thermal expansion of the rod lens array 203 can be reduced by increasing the number of adhesive portions 501 in accordance with the rigidity of the rod lens array 203.

3-2. Thermal Expansion of Exposure Head

Figure 11C:

FIG. 11C is a side view illustrating thermal expansion of the exposure head 106. Here, the reference temperature of the exposure head 106 is denoted by TO. The risen temperature is denoted by t, where t>T0. Also, dashed lines indicate the size of the exposure head 106 when the temperature of the exposure head 106 is the reference temperature T0. Solid lines indicate the size of the exposure head 106 when the temperature of the exposure head 106 is the temperature t. In this example, both the printed substrate 202 and the rod lens array 203 undergo expansion, but the expansion coefficient of the printed substrate 202 is greater than the expansion coefficient of the rod lens array 203.

Figure 12:
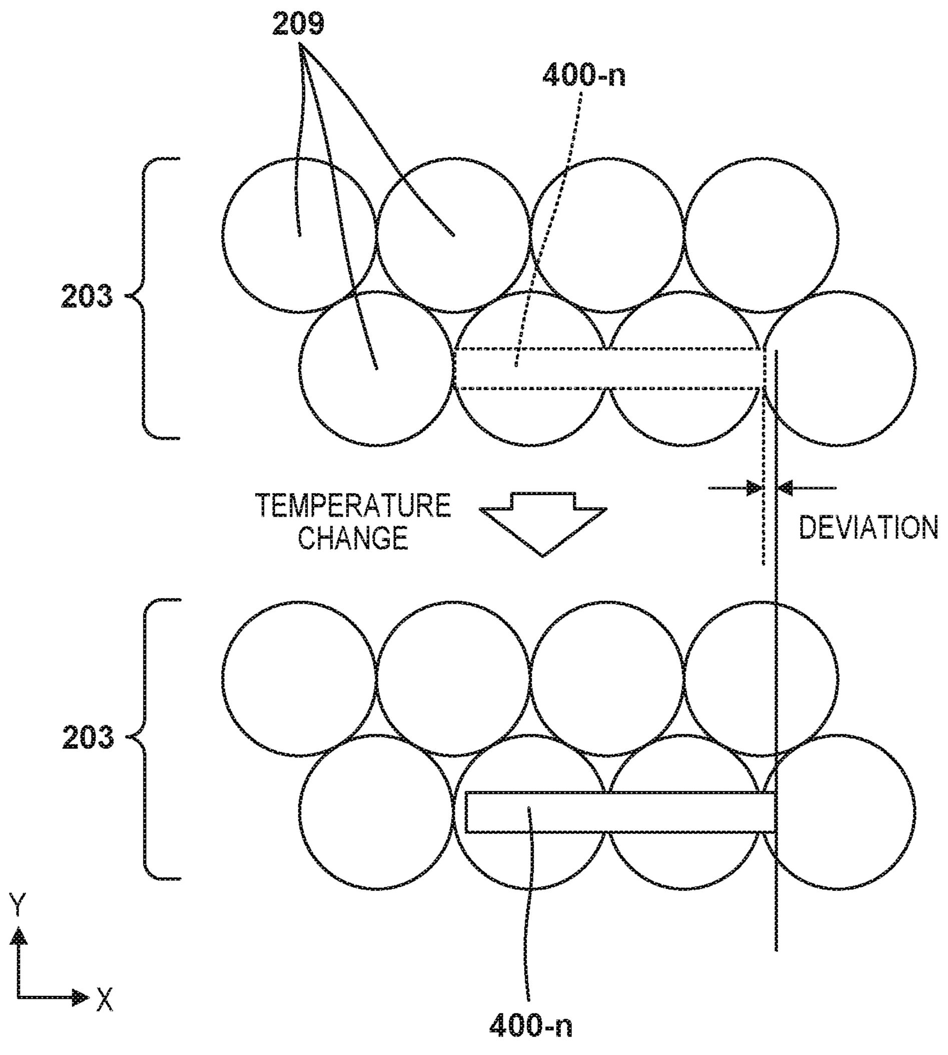
FIG. 12 is a diagram illustrating positions of individual rod lenses and the position of a light emitting chip.

FIG. 12 shows change in the position of the staggered rod lens array 203 and the position of the light emitting chip 400 caused by a change in temperature. The rod lens array 203 has a plurality of rod lenses 209 disposed in a staggered arrangement. As described above, the expansion coefficient of the printed substrate 202 is greater than the expansion coefficient of the rod lens array 203. For this reason, the light emitting chip 400 becomes displaced rightward (+X direction) relative to the positions of the individual rod lenses 209 forming the rod lens array 203.

It can be understood from FIG. 12 that the arrangement pitch of the individual rod lenses 209 forming the rod lens array 203 is much larger than the arrangement pitch of the individual light emitting elements 602 included in the light emitting chip 400.

3-3. Condensing Efficiency Profile and Correction Profile

Figure 13:
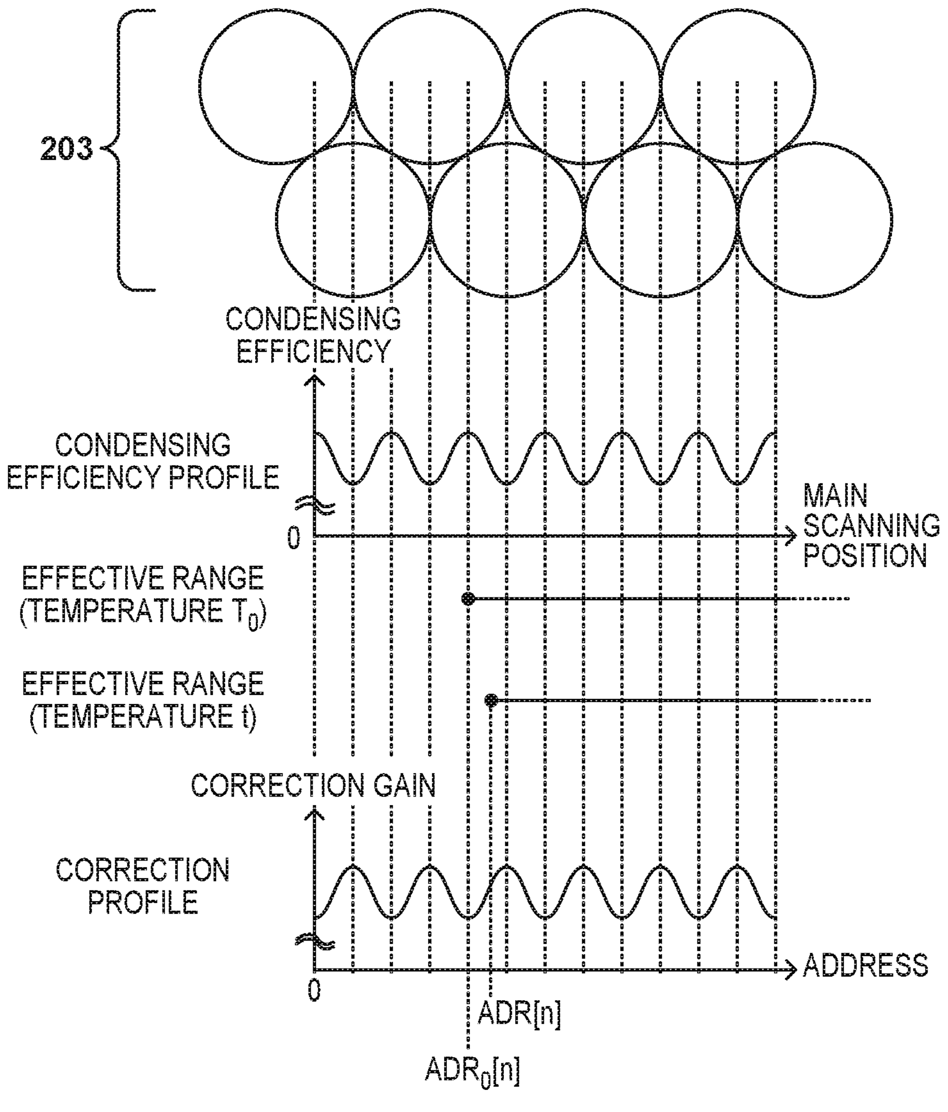
FIG. 13 is a diagram illustrating a method of correcting an exposure amount according to the position of a light emitting chip.

FIG. 13 shows the relationship between a condensing efficiency profile of the rod lens array 203 in the main scanning direction (X direction) and an exposure amount correction profile. The condensing efficiency of the rod lens array 203 is different for each position (main scanning position) in the main scanning direction. Accordingly, by measuring the condensing efficiency profile at the time of shipment from the factory, it is possible to create a correction profile indicating an exposure amount correction gain for each main scanning position based on the condensing efficiency profile. The correction profile is stored in an internal memory or the like of the light emission control unit 705. Also, the main scanning positions and addresses in the internal memory correspond to each other. Therefore, when exposing a pixel at a certain main scanning position, the light emission control unit 705 reads out the correction gain of the correction profile from the address that corresponds to that main scanning position, and corrects the exposure amount according to the correction gain. Unevenness in exposure in the lengthwise direction of the exposure head 106 is thus reduced.

Note that the condensing efficiency profile and the correction profile are created so as to match at a certain specified temperature (reference temperature T0). As described above, when the temperature of the exposure head 106 rises, the position of the rod lens array 203 and the position of the light emitting chip 400 become misaligned. As a result, the condensing efficiency profile and the correction profile become mismatched. In other words, the effective range of the correction profile at the temperature T0 and the effective range of the correction profile at the temperature t are misaligned in the main scanning direction.

As shown in FIG. 13, when the temperature of the exposure head 106 rises from the reference temperature T0 to t, an appropriate correction gain that corresponds to the temperature t can be read out by shifting the address (reference position) in the correction profile that is applied for a certain main scanning position. In this example, the address of the correction gain at the reference temperature T0 is ADR0[$n$], and the address of the correction gain at the temperature t is corrected to ADR[n]. In other words, by correcting the readout address in the correction profile according to the temperature t of the exposure head 106 detected by a temperature sensor or the like, the light emission control unit 705 can acquire an appropriate correction gain that corresponds to the temperature t and correct the exposure amount of each of the light emitting elements 602.

3-4. Internal Configuration of Light Emission Control Unit 705

Figure 14:
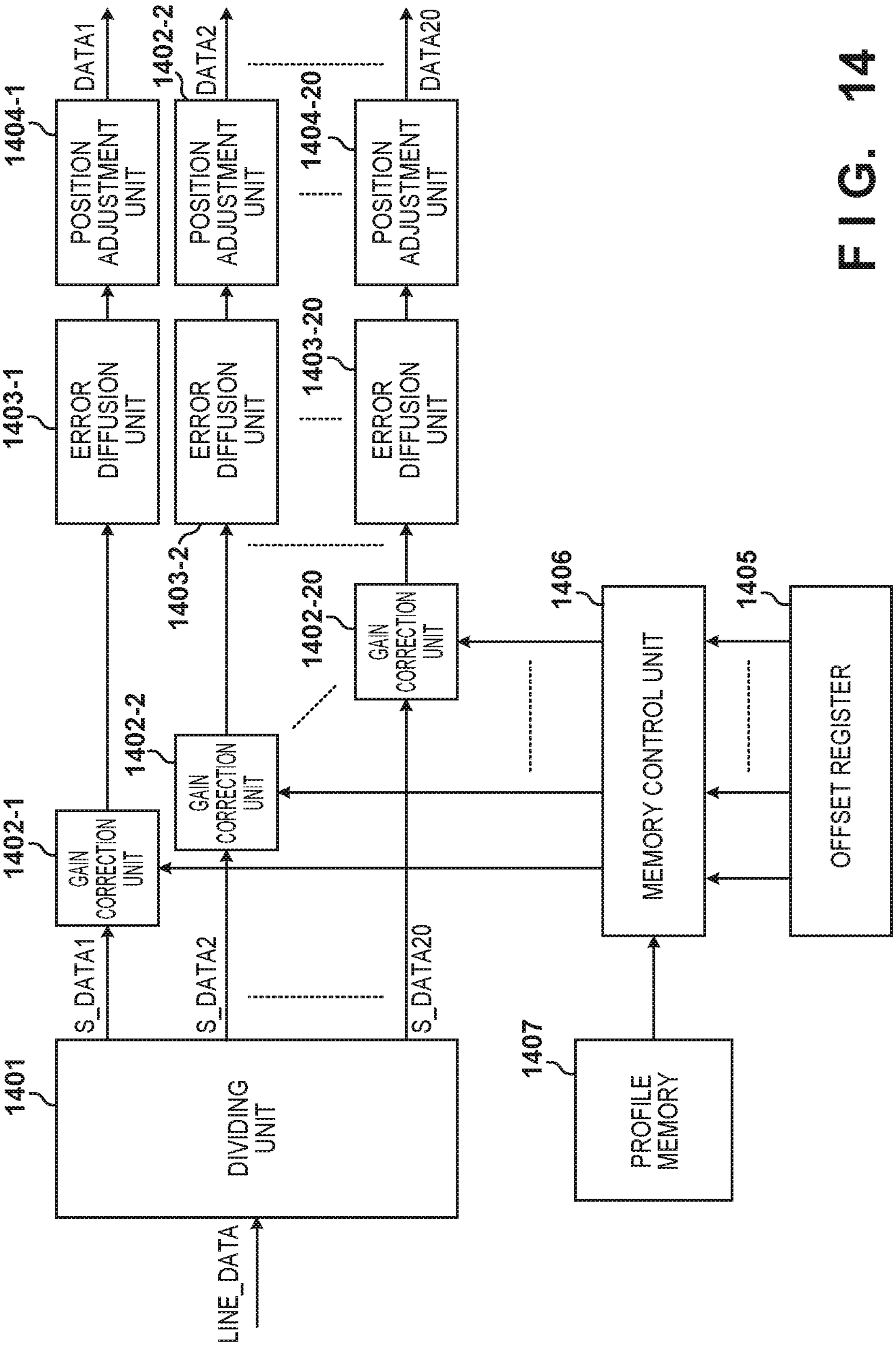
FIG. 14 is a diagram illustrating a light emission control unit.
Figure 15:
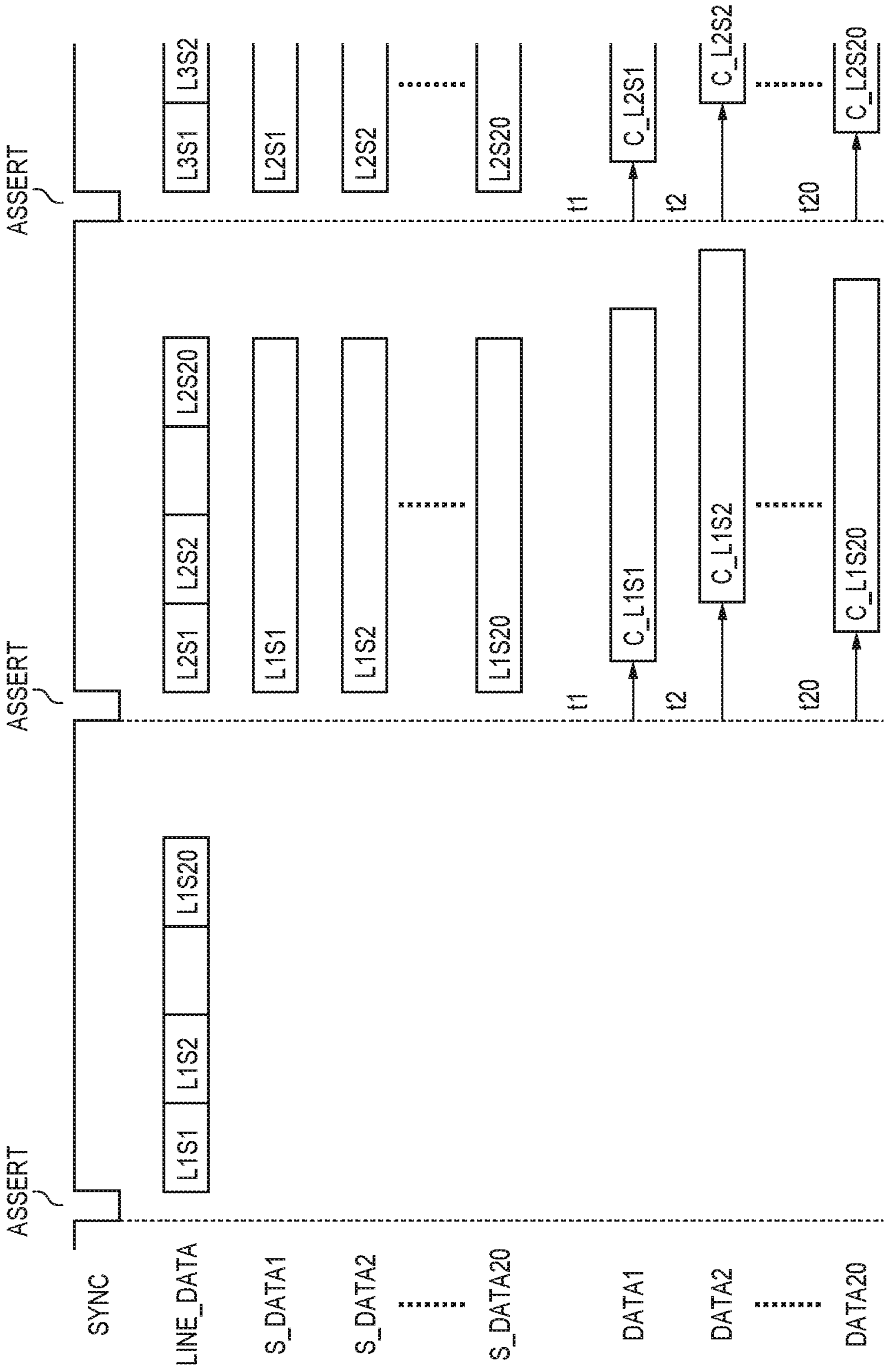
FIG. 15 is a sequence diagram showing signals involved in the correction method.

FIG. 14 is diagram illustrating operations of the light emission control unit 705. FIG. 15 is a timing chart showing the timing of various signals in the light emission control unit 705. In FIG. 15, LiSj indicates j-th segment data S_DATAj generated from i-th image data LINE_DATA. Also, C_LiSj indicates segment data obtained by applying gain correction, tone conversion (e.g., error diffusion), and exposure position adjustment to the j-th segment data S_DATAj generated from the i-th image data LINE_DATA. In this example, j ranges from 1 to 20, and this is because there are 20 light emitting chips 400. Therefore, if 17 light emitting chips 400 are employed, j ranges from 1 to 17.

The operations of blocks in the light emission control unit 705 are performed in units corresponding to the line synchronization signal transmitted via the signal line SYNC. Here, "assert" of the line synchronization signal corresponds to one line.

A dividing unit 1401 divides one line worth of the image data LINE_DATA from the image data processing unit 703 into pieces of segment data S_DATA1 to S_DATA20. As shown in FIG. 15, when the line synchronization signal is asserted, the dividing unit 1401 receives one line worth of the image data LINE_DATA from the image data processing unit 703. When the line synchronization signal is asserted the next time, the dividing unit 1401 divides one line worth of the image data LINE_DATA into 20 pieces of segment data S_DATA1 to S_DATA20, and outputs the pieces to the corresponding gain correction units 1402-1 to 1402-20. Note that the pieces of segment data S_DATA1 to S_DATA20 are read out at a speed slower than the write speed. A slower readout speed is employed in order to match the transfer speed of the data S_DATA1 to S_DATA20 with the exposure scanning speed of the light emitting chip 400.

Gain correction units 1402-1 to 1402-20 respectively correct the gains of the corresponding pieces of segment data S_DATA1 to S_DATA207. For example, a j-th gain correction unit 1402-*j* multiplies segment data S_DATAj by the correction gain to obtain a product, and outputs the product, including the fractional part, to a j-th error diffusion unit 1403-*j*.

Error diffusion units 1403-1 to 1403-20 respectively apply error diffusion processing to the output received from the corresponding gain correction units 1402-1 to 1402-20, and return the pixel values to 1-bit tone while preserving the area density, and output the result. The output of the j-th error diffusion unit 1403-*j* is output to a j-th position adjustment unit 1404-*j*.

Position adjustment units 1404-1 to 1404-20 respectively output the pieces of segment data S_DATA1 to S_DATA20 with a delay corresponding to delay times t1 to t20, which are adjustment values for adjusting the corresponding exposure positions. For example, the j-th segment data S_DATAj is output to the subsequent stage at a timing that is the delay time tj after the fall of the line synchronization signal. For example, the segment data S_DATAj is output to the corresponding signal line DATAj. The delay times t1 to t20 are each an integer multiple of an exposure time per pixel Te.

A profile memory 1407 is a storage device that stores the correction profile described above. A memory control unit 1406 calculates a readout address ADR based on an offset value pj supplied from an offset register 1405. The memory control unit 1406 reads out a correction gain GAINj from the profile memory 1407 based on the readout address ADR, and sets the readout correction gain in the corresponding gain correction unit 1402-*j*. The offset value pj is determined according to the temperature t, as will be described later.

Figure 16A:
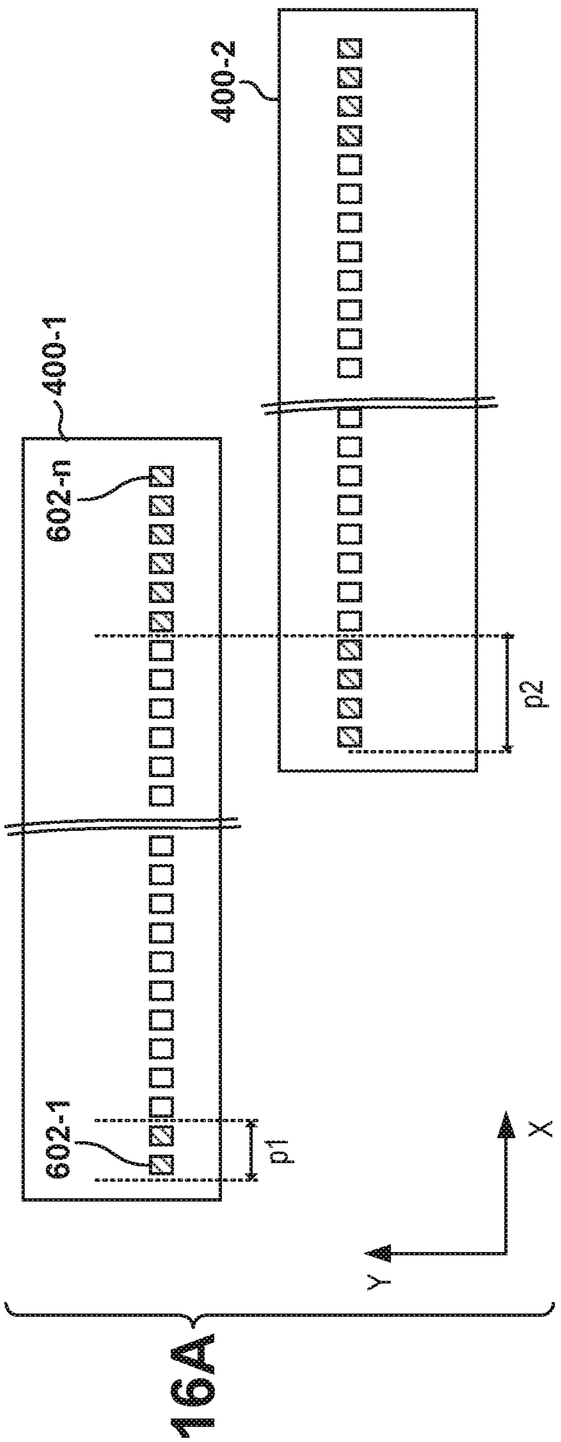
FIGS. 16A and 16B are diagrams illustrating an arrangement of light emitting chips and an arrangement of light emitting elements.
Figure 16B:
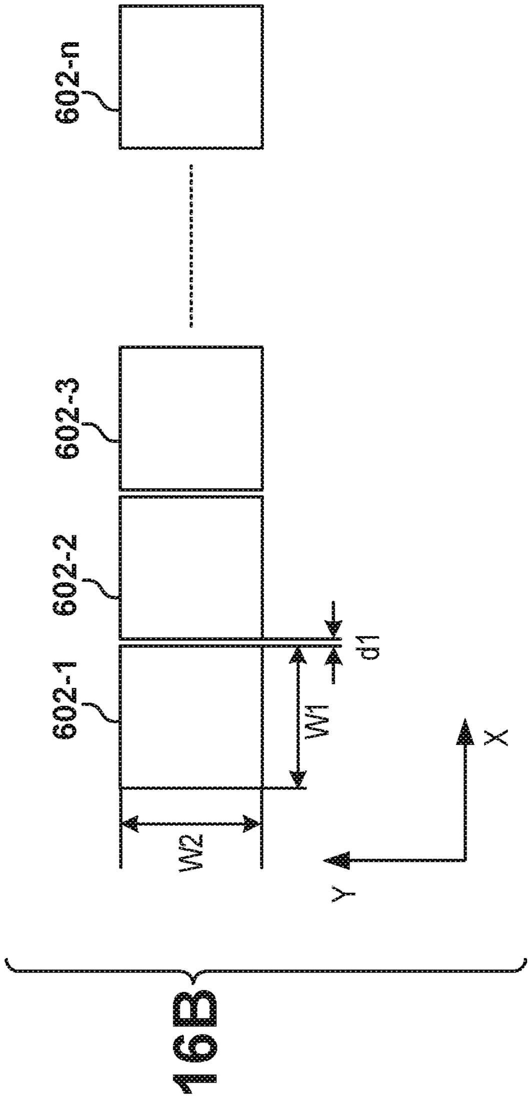

FIG. 16A shows a junction between the light emitting chip 400-1 and the light emitting chip 400-2. FIG. 16B shows n light emitting elements 602-1 to 602-*n* that constitute one light emitting chip 400. In this example, the distance between adjacent light emitting elements 602 is denoted by d1. Also, the light emitting elements 602-1 to 602-*n* are light emitting elements that have square light emitting surfaces (i.e., W1=W2).

Returning to FIG. 16A, the light emitting elements 602 shown with hatching correspond to ineffective pixels at which light exposure is not executed. The light emitting elements 602 not shown with hatching correspond to effective pixels at which light exposure is executed. In other words, one series of effective pixels may also be referred to as the effective range.

The effective range is adjusted according to the state in which the light emitting chips 400-1 to 400-20 are mounted. The offset values p1 to p20 indicate the start positions of the corresponding effective ranges. Note that the offset value p2 indicates the end position of the effective range of the light emitting chip 400-1. Generally speaking, the start position of the effective range of the light emitting chip 400-*i* is set by the offset value pi, and the end position of the effective range of the light emitting chip 400-*i* is set by the offset value pi+1. By setting the offset values p1 to p20 in this way, it is possible to make the exposure amount constant at the junction between adjacent light emitting chips 400-*i* and 400-*i*+1.

In this way, the initial values of the offset values p1 to p20 are determined in advance at the time of shipment from the factory such that the exposure amount is constant at the junction between the light emitting chip 400-*i* and the light emitting chip 400-*i*+1. Also, the offset values p1 to p20 set in the offset register 1405 for the reference temperature T0 may be used as the initial value ADR0[*n*] of the readout address ADR[n] in the profile memory 1407. Also, the readout address ADR[n] may be calculated by adding the offset values p1 to p20 set in the offset register 1405 for the temperature t to the initial value ADR0[*n*]. In other words, the offset values p1 to p20 for the temperature t may be calculated by adding correction values that correspond to the temperature t to the offset values p1 to p20 (initial values) for the reference temperature T0. For each pixel, the memory control unit 1406 increments the 20 readout addresses ADR to obtain gain data for the 20 gain correction units 1402-1 to 1402-20.

3-5. Flowchart

Figure 17:
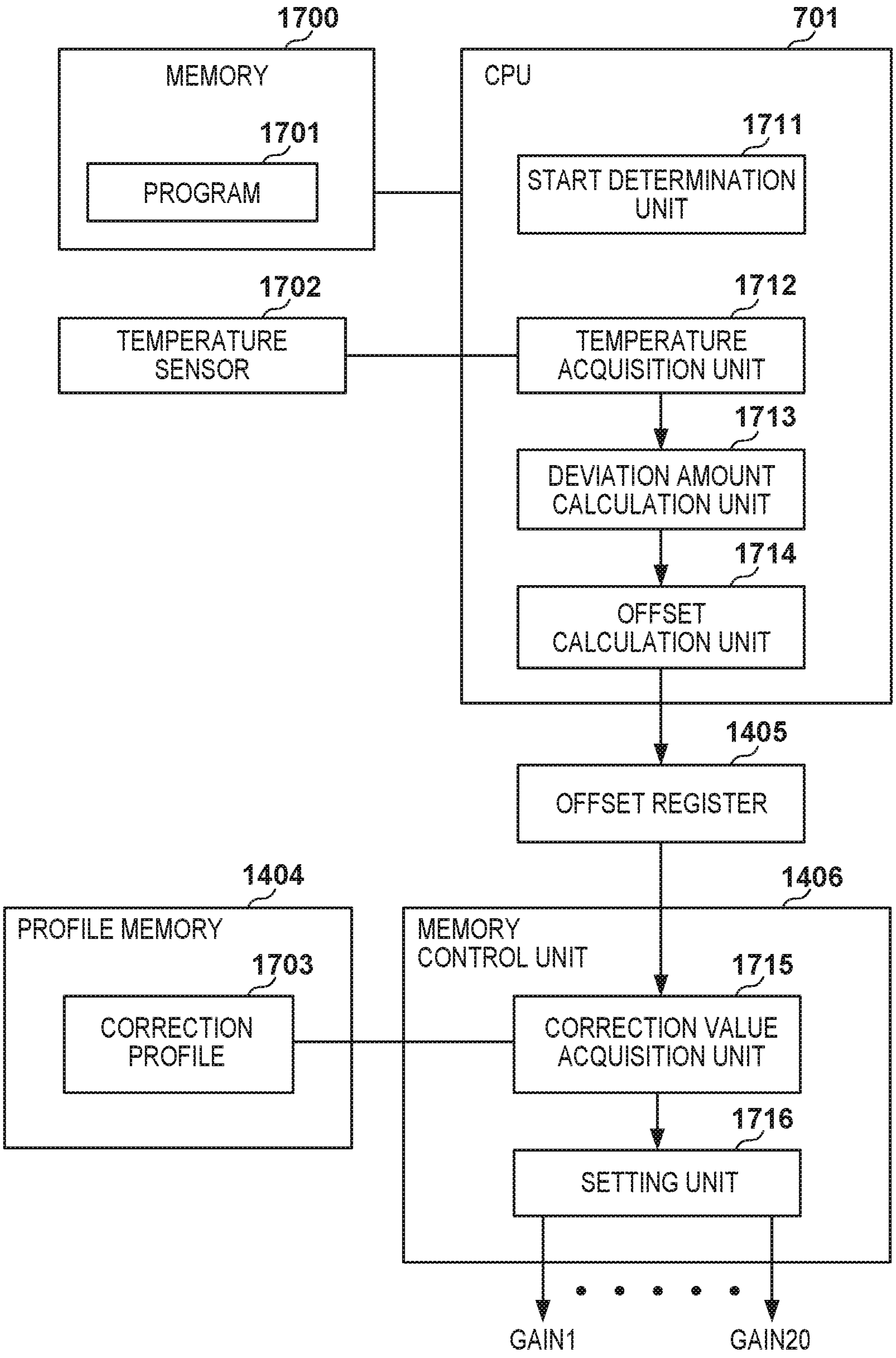
FIG. 17 is a diagram illustrating functions of a CPU.

FIG. 17 shows details of functions of the CPU 701. The CPU 701 implements various functions by executing a program 1701 stored in the ROM area of a memory 1700.

A start determination unit 1711 determines whether or not a start condition for starting processing for readout address correction due to a temperature rise is satisfied. Examples of the start condition include "every page", "every print job", and "change in temperature exceeds threshold value". The adopted condition may be selected according to the elapsed time from a reference timing. The reference timing is the timing when the main switch of the image forming apparatus 1 is turned on and the image forming apparatus 1 is started up, for example. The heat dissipation performance of the image forming apparatus 1 may also be taken into consideration. In other words, if the image forming apparatus 1 has a fast rate of temperature change, the correction processing is executed more frequently, whereas if the image forming apparatus 1 has a slow rate of temperature change, the correction processing is executed less frequently.

A temperature acquisition unit 1712 acquires the temperature t of the image forming apparatus 1. For example, the temperature acquisition unit 1712 acquires the temperature t of the image forming apparatus 1 from a temperature sensor 1702 connected to the CPU 701. Alternatively, the temperature acquisition unit 1712 may estimate the temperature t based on a physical parameter correlated with the temperature t of the image forming apparatus 1. The temperature t of the image forming apparatus 1 is the temperature of the exposure head 106, for example. However, any temperature correlated with the temperature of the exposure head 106 (e.g., the internal temperature of the image forming apparatus 1) can be used.

A deviation amount calculation unit 1713 calculates a deviation amount ΔAj of the correction profile 1703 relative to the condensing efficiency profile. The deviation amount calculation unit 1713 may use the following equation, for example.

$$\Delta Aj=\text{round}(aj\times(t-T0)) \quad \text{Eq.1}$$

Here, j is a number for distinguishing the light emitting chips 400 from each other, and j ranges from 1 to 20 in the present embodiment. Also, round( ) is a function representing rounding off. T0 is the reference temperature. Also, aj is a constant that is dependent on the structure of the exposure head 106, more specifically, a proportionality constant that indicates a temperature-dependent deviation amount determined in advance for each of the light emitting chips 400.

An offset calculation unit 1714 calculates an offset value for the readout address ADR[n] in the correction profile 1703. Here, OFF0[*j*] denotes the offset value (the offset value due to the structure of the exposure head 106) in the correction profile 1703 for the light emitting chip 400-*j* at the reference temperature T0. Also, OFF[j] denotes the offset value in the correction profile 1703 for light emitting chip 400-*j* at the temperature t. The offset value OFF[j] is calculated using the following equation, for example.

$$OFF[j]=OFF0[j]+\Delta Aj \quad \text{Eq.2}$$

The offset calculation unit 1714 writes the offset value OFF[j] to the offset register 1405. In other words, the offset values OFF[1] to OFF[20] are written to the offset register 1405 as the offset values p1 to p20.

The memory control unit 1406 includes a correction value acquisition unit 1715 and a setting unit 1716. The correction value acquisition unit 1715 obtains the readout addresses ADR[1] to ADR[20] in accordance with the offset values p1 to p20 set in the offset register 1405.

$$ADR[j]=ADR0[j]+pj \quad \text{Eq.3}$$

The correction value acquisition unit 1715 acquires the correction gains GAIN1 to GAIN20 from the correction profile 1703 based on the readout addresses ADR[1] to ADR[20], and passes the acquired correction gains to the setting unit 1716. The setting unit 1716 sets the correction gains GAIN1 to GAIN20 in the corresponding gain correction units 1402-1 to 1402-20.

Figure 18:
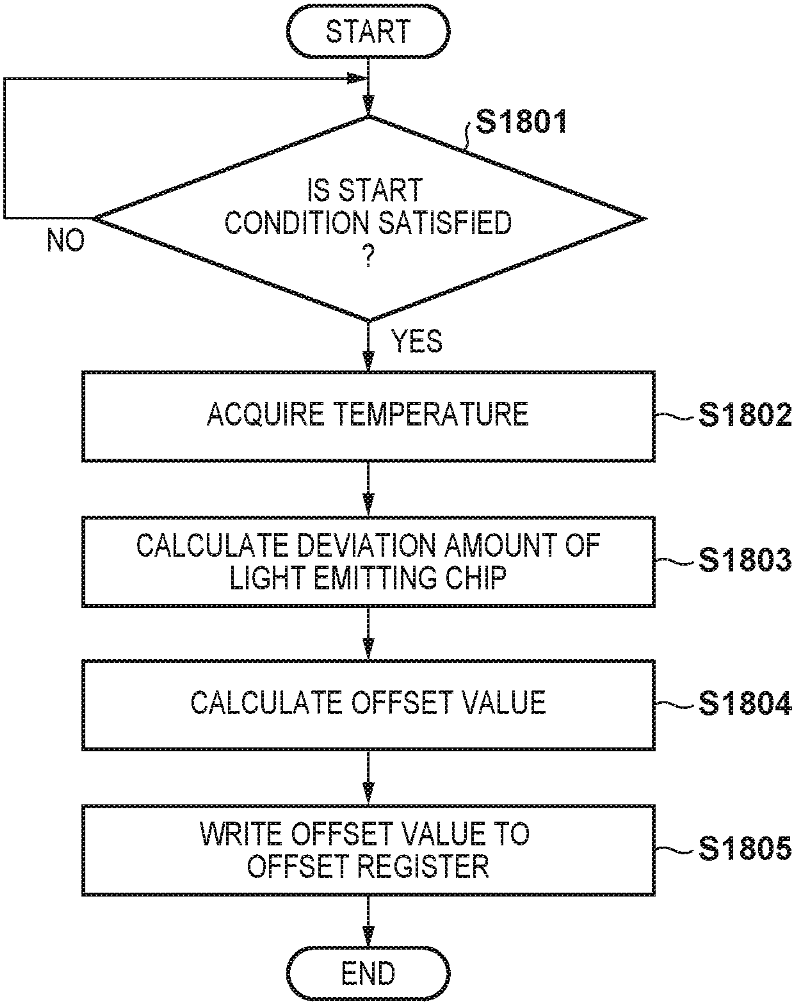
FIG. 18 is a flowchart showing a readout address correction method.

FIG. 18 is a flowchart of correction processing. In step S1801, the CPU 701 (start determination unit 1711) determines whether the start condition described above is satisfied. If the start condition is satisfied, the CPU 701 advances the processing from step S1801 to step S1802.

In step S1802, the CPU 701 (temperature acquisition unit 1712) acquires the temperature t of the image forming apparatus 1. In step S1803, the CPU 701 (deviation amount calculation unit 1713) calculates the deviation amount ΔAj of the j-th light emitting chip 400 based on the temperature t (j=1 to 20).

In step S1804, the CPU 701 (offset calculation unit 1714) calculates the offset value OFF[j] for the j-th light emitting chip 400 based on the deviation amount ΔAj of the j-th light emitting chip 400. In step S1805, the CPU 701 (offset calculation unit 1714) writes the offset value OFF[j] to the offset register 1405 as pj.

4. Other Embodiments

The above embodiment can also be implemented in an aspect in which a program that implements one or more functions is supplied to a system or a device via a network or a storage medium, and one or more processors in a computer of the system or the device reads out and executes the program. The above embodiment can also be implemented by a circuit (e.g., an ASIC) that implements one or more functions.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-160469, filed Oct. 4, 2022, which is hereby incorporated by reference herein in its entirety.

What is claimed is:

1. An exposure apparatus comprising:

an exposure head including:

- a substrate on which a plurality of light sources are mounted in an arrangement along an axial direction of a photosensitive member,
- a condensing optical system arranged along a lengthwise direction of the substrate and configured to condense light output from the plurality of light sources onto a circumferential surface of the photosensitive member to form a plurality of exposure spots on the circumferential surface, and a support member supporting the substrate and the condensing optical system;

a memory having stored therein a profile indicating correction gains for exposure amounts, the correction gains corresponding to condensing efficiencies of the condensing optical system at a plurality of positions along the lengthwise direction;

a sensor configured to detect a temperature correlated with a temperature of the exposure head; and at least one processor configured to perform operations, the operations including:

acquiring, by referencing the profile, a correction gain that corresponds to a position, along the lengthwise direction of the substrate, of a light source that reached an exposure timing among the plurality of light sources;

correcting, for each of the light sources, an exposure amount of the light source with the correction gain corresponding to the position of the light source; and adjusting, for each of the light sources, a reference position of the corresponding correction gain in the profile in accordance with the temperature detected by the sensor, wherein the profile includes a profile indicating the correction gains for the exposure amounts corresponding to the condensing efficiencies of the condensing optical system at the plurality of positions along the lengthwise direction at a predetermined temperature, and the adjusting includes:

obtaining a difference between the predetermined temperature and the temperature detected by the sensor, obtaining a product for each of the light sources by multiplying the difference by a constant corresponding to the light source, and adjusting, for each of the light sources, the reference position of the corresponding correction gain in accordance with the corresponding product.

2. The exposure apparatus according to claim 1, wherein each of the light sources includes a plurality of organic electro luminescence (EL) light emitting elements arranged at a constant interval.

3. The exposure apparatus according to claim 2, wherein the operations further include:

distributing pixels values of a plurality of pixels forming one line along a lengthwise direction of the exposure head to the plurality of light sources by dividing the pixel values into segments, and the correcting includes applying, for each of the light sources, the same correction gain for the plurality of light emitting elements included in the light source.

4. The exposure apparatus according to claim 3, wherein the operations further include:

dividing the pixel values of the pixels forming one line along the lengthwise direction of the exposure head into segments, correcting the pixel values according to the corresponding correction gain to obtain corrected pixels values, and outputting tone-converted pixel values obtained by performing tone conversion on the pixel values corrected according to the corresponding correction gain.

5. The exposure apparatus according to claim 4, wherein the correcting of the pixel values according to the corresponding correction gain, and the outputting of the tone-converted pixel values obtained by performing tone conversion on the pixel values corrected according to the corresponding correction gain are executed for each of the light sources.

6. The exposure apparatus according to claim 2, wherein the condensing optical system includes a plurality of rod lenses arranged along a lengthwise direction of the exposure head.

7. The exposure apparatus according to claim 6, wherein the plurality of rod lenses are disposed in a staggered arrangement.

8. The exposure apparatus according to claim 6, wherein an area of a light incident surface of each of the rod lenses is larger than an area of a light emitting surface of each of the light emitting elements.

9. The exposure apparatus according to claim 6, wherein an arrangement pitch of the plurality of rod lenses is different from an arrangement pitch of the plurality of light sources.

10. The exposure apparatus according to claim 1, wherein the adjusting includes rounding the product for each of the light sources in accordance with a smallest unit of reference positions of the correction gains.

11. The exposure apparatus according to claim 1, wherein reference positions of the correction gains are readout addresses of the profile stored in the memory, and the adjusting includes offsetting the readout address for each of the light sources in accordance with the corresponding product.

12. The exposure apparatus according to claim 1, wherein the operations further include:

determining whether or not a predetermined start condition is satisfied, and the adjusting includes executing the adjusting of the reference positions in a case in which the predetermined start condition is satisfied.

13. The exposure apparatus according to claim 12, wherein the predetermined start condition is a condition set such that a frequency of execution of the adjusting increases as the temperature of the exposure head is determined to rise.

14. The exposure apparatus according to claim 12, wherein the predetermined start condition includes at least one of:

every page of image formation performed by the exposure device, every print job given to the exposure device, and an amount of change of the temperature detected by the sensor relative to a reference temperature that exceeds a threshold value.

15. An image forming apparatus comprising:

a charger configured to uniformly charge a surface of a photosensitive member;

an exposure device;

the photosensitive member configured to be exposed by the exposure device such that an electrostatic latent image is formed on the photosensitive member;

a developing unit configured to form a toner image by developing the electrostatic latent image with a toner;

a transfer device configured to transfer the toner image from the photosensitive member to a sheet; and a fixing device configured to fix the toner image to the sheet, wherein the exposure device includes:

an exposure head including:

a substrate on which a plurality of light sources are mounted in an arrangement along an axial direction of a photosensitive member, a condensing optical system arranged along a lengthwise direction of the substrate and configured to condense light output from the plurality of light sources onto a circumferential surface of the photosensitive member to form a plurality of exposure spots on the circumferential surface, and a support member supporting the substrate and the condensing optical system;

a memory having stored therein a profile indicating correction gains for exposure amounts, the correction gains corresponding to condensing efficiencies of the condensing optical system at a plurality of positions along the lengthwise direction;

a sensor configured to detect a temperature correlated with a temperature of the exposure head; and at least one processor configured to perform operations, the operations including:

acquiring, by referencing the profile, a correction gain that corresponds to a position, along the lengthwise direction of the substrate, of a light source that reached an exposure timing among the plurality of light sources;

correcting, for each of the light sources, an exposure amount of the light source with the correction gain corresponding to the position of the light source; and adjusting, for each of the light sources, a reference position of the corresponding correction gain in the profile in accordance with the temperature detected by the sensor, wherein the profile includes a profile indicating the correction gains for the exposure amounts corresponding to the condensing efficiencies of the condensing optical system at the plurality of positions along the lengthwise direction at a predetermined temperature, and the adjusting includes:

obtaining a difference between the predetermined temperature and the temperature detected by the sensor, obtaining a product for each of the light sources by multiplying the difference by a constant corresponding to the light source, and adjusting, for each of the light sources, the reference position of the corresponding correction gain in accordance with the corresponding product.

* * * * *